Oct. 23, 1934.　　　F. J. MacDONALD　　　1,978,051
APPARATUS FOR CUTTING SHEET MATERIAL
Filed Feb. 15, 1934
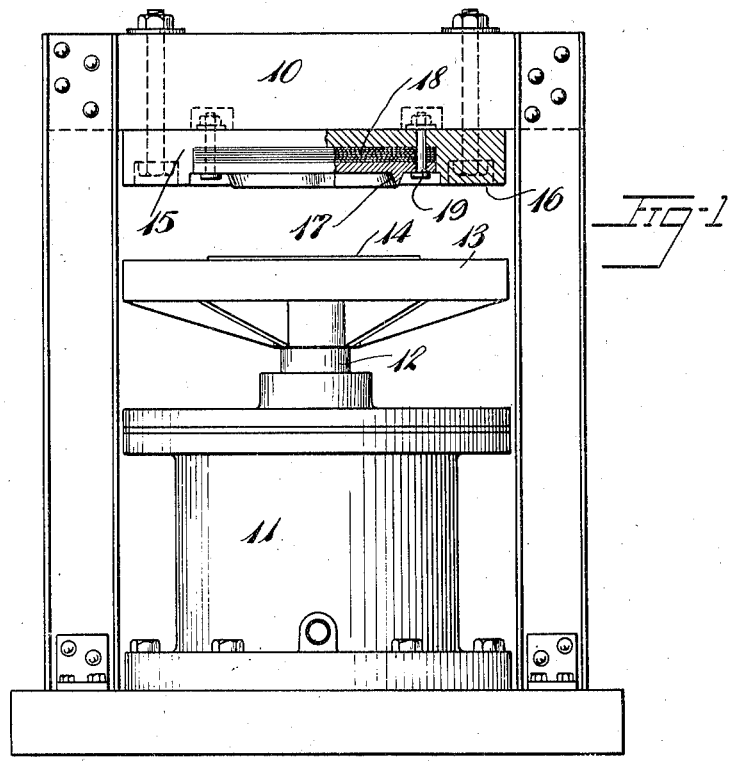
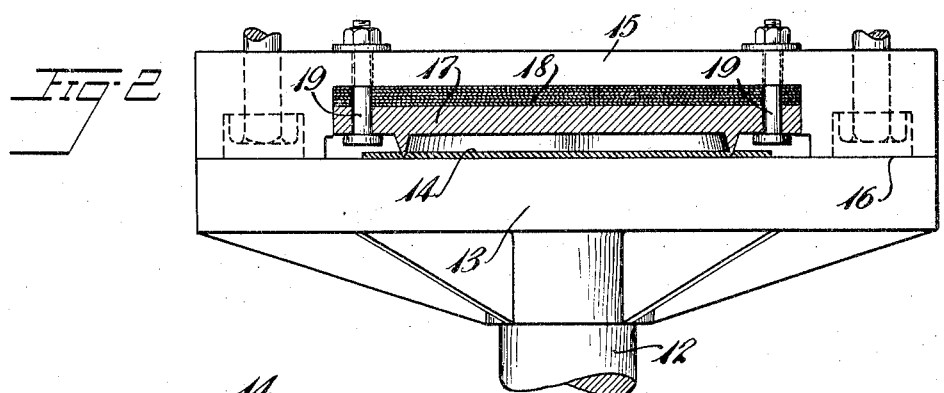
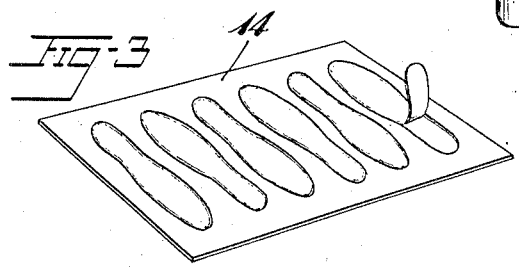

Patented Oct. 23, 1934

1,978,051

UNITED STATES PATENT OFFICE

1,978,051

APPARATUS FOR CUTTING SHEET MATERIAL

Frank J. MacDonald, Brookline, Mass., assignor to Hood Rubber Company, Inc., Watertown, Mass., a corporation of Delaware Application February 15, 1934, Serial No. 711,337

3 Claims. (Cl. 164—18)

This invention relates to procedure and apparatus for cutting sheet material and its chief objects are to provide economy of apparatus and of operation and especially to provide against early damage of a hard backing member used in conjunction with a cutting die.

A more specific object is to avoid the necessity of closely regulating the amount of pressure applied to the cutting die in order to make sure that it cuts through the sheet material throughout the length of its cutting edge without excessively cutting into or marring the backing member.

Of the accompanying drawing:

Fig. 1 is an elevation, with parts sectioned and broken away, of apparatus embodying and adapted to carry out my invention in its preferred form.

Fig. 2 is an elevation on a larger scale of the parts adjacent the work, the work, cutting die and parts of its mounting being shown in section.

Fig. 3 is a perspective view of a sheet of material and a plurality of blanks cut therefrom.

Referring to the drawing, 10 is the frame or arch of a press having a cylinder 11 with a ram 12 therein. Secured upon the ram 12 is a lower platen 13 preferably having a plane upper surface of hard metal adapted to support the sheet material 14 to be cut, although cutting plates or backing members of less hard material, such as fiber board, may be used without sacrifice of all of the advantages of the invention.

Mounted in the frame of the press is an upper platen 15 having a plane marginal face 16 of large area adapted to engage the plane upper face of the lower platen 13 for positively and accurately limiting the upward movement of the lower platen under great pressure without damage to the face of either platen, these meeting faces being finished with extreme accuracy.

In a recess formed in the middle region of the upper platen 15 is mounted a cutting die 17 backed by a set of extremely thin shims 18, 18, the die being held against the shims by bolts 19, 19. The number and thickness of the shims and the setting up of the bolts 19 are such that the cutting edge of the die 17 is even with the stop face 16 of the platen, if metal shims are used, so that the die will precisely cut just through the sheet material 14 without marring the upper face of the platen 13 when the latter is stopped by the stop-face 16 of the upper platen.

The shims 18 may be of paper, highly compressed by the setting up of the bolts 19, in which case the cutting edge of the die, when the press is open, preferably projects a very small distance below the stop face 16, that distance and the further compressibility of the shims being so coordinated that the die will have cut through the sheet material 14 when the lower platen abuts the stop face 16 but will have receded to the same plane as that of the stop face without developing such resistance of the shims to further compression as to mar the face of the lower platen.

In each case the stop face in conjunction with extreme accuracy of construction completely avoids the necessity for reliance upon contact of the die with the member against which it cuts for sustaining the excess of pressure over that required for making certain of a complete cutting operation and a very high total pressure may be employed without the necessity of closely regulating it.

I claim:

1. Apparatus for cutting sheet material, said apparatus comprising a cutting die, a backing for the die to cut against, means for moving one of the same toward the other, positive contact means other than the cutting edge of the die for stopping such movement when the cutting edge of the die has arrived at the surface of the backing member but has not substantially indented the same, and resilient spacer means interposed operatively between the contact means, and the die.

2. Apparatus for cutting sheet material, said apparatus comprising a cutting die, a backing for the die to cut against, means for moving one of the same toward the other, and positive contact means on the die assembly for engaging the backing assembly to stop such movement, the die and the said contact means having substantially rigid connection with each other and the parts being so proportioned that the said contact means positively prevents excessive pressure of the cutting edge of the die against the backing.

3. Apparatus for cutting sheet material, said apparatus comprising a platen formed with a stop-face and with a recess, a cutting die mounted in said recess, a set of shims mounted in the recess back of the die, means for holding the die against the shims, and backing means for the die to cut against and for engaging the said stop-face to limit the relative movement of the die toward the backing.

FRANK J. MacDONALD.